United States Patent
Pezzi et al.

(10) Patent No.: US 9,422,025 B2
(45) Date of Patent: Aug. 23, 2016

(54) FORK ASSEMBLY WITH ELECTROVALVE

(71) Applicant: TENNECO MARZOCCHI S.R.L., Zola Predosa (BO) (IT)

(72) Inventors: Enrico Pezzi, Cesena (IT); Francesco Frontali, Budrio (IT); Claudio Caporaletti, San Giovanni In Persiceto (IT)

(73) Assignee: VRM S.P.A., Zola Predosa, Bologna (IT)

( * ) Notice: Subject to any disclaimer, the term of this patent is extended or adjusted under 35 U.S.C. 154(b) by 0 days.

(21) Appl. No.: 14/436,595

(22) PCT Filed: Oct. 25, 2013

(86) PCT No.: PCT/EP2013/072446
§ 371 (c)(1),
(2) Date: Apr. 17, 2015

(87) PCT Pub. No.: WO2014/072191
PCT Pub. Date: May 15, 2014

(65) Prior Publication Data
US 2016/0167729 A1    Jun. 16, 2016

(30) Foreign Application Priority Data

Nov. 8, 2012    (IT) .............................. AN2012A0145

(51) Int. Cl.
*B62K 25/08*    (2006.01)
*F16F 9/46*    (2006.01)

(52) U.S. Cl.
CPC ................. *B62K 25/08* (2013.01); *F16F 9/464* (2013.01)

(58) Field of Classification Search
CPC ............ B62K 25/06; B62K 25/08; F16F 9/46
See application file for complete search history.

(56) References Cited

U.S. PATENT DOCUMENTS

| 5,027,927 A | * | 7/1991 | Bacardit | ................... F16F 9/46 |
| | | | | 188/266.5 |
| 5,833,037 A | | 11/1998 | Preukschat | |
| 2006/0137947 A1 | | 6/2006 | Fujita | |

FOREIGN PATENT DOCUMENTS

| DE | 19836286 A1 | 2/2000 |
| EP | 1544094 A1 | 6/2005 |
| EP | 2413001 A1 | 2/2012 |
| EP | 2413002 A1 | 2/2012 |
| GB | 2190461 A | 11/1987 |
| JP | 2012107696 A | 6/2012 |

OTHER PUBLICATIONS

International Search Report for corresponding International Application No. PCT/EP2013/072446.

* cited by examiner

*Primary Examiner* — Kevin Hurley
(74) *Attorney, Agent, or Firm* — Egbert Law Offices, PLLC

(57) ABSTRACT

A fork assembly having an external pipe closed on top with a first plug, an internal pipe slidably housed inside the external pipe, and a cartridge disposed inside the internal pipe and closed with a closing bush. The fork also has an electrovalve disposed in intermediate position between the closing bush of the cartridge and the first plug of the external pipe.

7 Claims, 4 Drawing Sheets

FORK ASSEMBLY WITH ELECTROVALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a fork assembly with electrovalve.

2. Description of Related Art Including Information Disclosed Under 37 CFR 1.97 and 37 CFR 1.98.

The fork is a very important part of a motorcycle and greatly affects the motorcycle stability.

More precisely, the fork of a motorcycle guarantees connection between a wheel of the motorcycle and the ground in any circumstance, regardless of ground conditions (paved ground, dirt roads, holes, etc.) and climatic conditions.

FIG. 1 is a sectional view of a fork according to the prior art, generally indicated with reference numeral (100).

The fork (100) comprises an external pipe (1), or sleeve, and an internal pipe (2), or tube, which telescopically slides inside the external pipe (1).

The fork also comprises a first plug (10) that hermetically closes the upper end of the external pipe (1), and a second plug (20) that closes the lower end of the internal pipe (2) that is fixed to the hub of a wheel.

A cartridge (3) is disposed inside the internal pipe (2) and fixed to the second plug (20) of the internal pipe (2). Consequently, the cartridge (3) is joined to the internal pipe (2). The cartridge (3) is provided with a chamber (C1) filled with oil or other lubricant.

A piston (4) is slidably mounted inside the cartridge (3) and slides inside the chamber (C1). The piston (4) is provided with holes or blades (40) adapted to make the oil pass through the piston (4) during its movement in the chamber (C1).

A second piston (41) is joined to the second plug (20) of the internal pipe (2) and is provided with holes or blades for oil passage.

A tubular rod (5) is provided with a lower end fixed to the piston (4) and an upper end fixed to the first plug (10) of the external pipe (1). Therefore, the tubular rod (5) is joined to the external pipe (1). The tubular rod (5) is internally empty and defines an axial conduit (50) for oil passage.

Moreover, said tubular rod (5) has a lower diameter than the chamber (C1) of the cartridge (3) in such manner to be received inside said cartridge (3).

The upper end of the cartridge (3) is closed with a closing bush (30) provided with a hole that receives the tubular rod (5) and acts as guide for said tubular rod (5).

A pin (S) is provided inside the axial conduit (50) of the tubular rod (5), in proximity to the piston (4), and slides inside said axial conduit (50) in order to adjust the oil flow through the axial conduit. In other words, by manually adjusting the position of the pin (S), the quantity of oil flowing inside the axial conduit (50) of the tubular rod (5) can be adjusted.

The closing bush (30) of the cartridge (3) separates the chamber (C1) of the cartridge (3) from a working chamber (C2), in external position with respect to the cartridge (3). More precisely, the working chamber (C2) is defined in lower position by the second plug (20) and in upper position by the first plug (10) of the external pipe (1).

The two pistons (4, 41) divide the chamber (C1) of the cartridge (3) into three chambers (C1a, C1b, C1c), of which a first chamber (C1a), a second chamber (C1b) and a third chamber (C1c).

More precisely, the first chamber (C1a) of the cartridge (3) is defined by the piston (4) and the closing bush (30) of the cartridge, the second chamber (C1b) of the cartridge (3) is defined by the second piston (41) and the piston (4) and the third chamber (C1c) is defined by the second plug (20) of the internal pipe (2) and by the second piston (41).

A spring (M1) is disposed inside the internal pipe (2) in the working chamber (C2) around a spring guide (61) and is interposed between the closing bush (30) of the cartridge (3) and a metal ring (7) fixed to the spring guide (61). By actuating on the metal ring (7), the compression level of the spring (M1) can be adjusted.

Advantageously, a second spring (M2) is disposed around the tubular rod (5) above the piston (4) and inside the cartridge (3). The second spring (M2) is stopped against the closing bush (30) of the cartridge (3) at the end of the extension travel of the fork (100).

During the compression of the fork the internal pipe (2) and the external pipe (1) are brought near each other, the spring (M1) is compressed and the oil inside the second chamber (C1b) is compressed between the two pistons (4, 41).

While the fork is compressed, the two pistons (4, 41) are brought near to each other and the tubular rod (5) penetrates inside the first chamber (C1a) of the cartridge (3).

It must be noted that only a first part of the oil contained inside the second chamber (C1b) of the cartridge (3) passes through the holes or blades (40) of the piston (4) and is conveyed inside the first chamber (C1a) of the cartridge (3) because a portion of the tubular rod (5) is positioned inside the first chamber (C1a), occupying a space that is proportional to the compression of the fork.

Therefore, a second part of the oil contained in the second chamber (C1b)—which is not contained inside the first chamber (C1a)—partially passes through the axial conduit (50) of the tubular rod (5), divided by the pin (S), and partially passes through the holes or blades of the second piston (41) and is then conveyed into the working chamber (C2) through one or more holes (31) obtained on the cartridge (3) in the third chamber (C1c) of the cartridge (3).

Successively, during the extension travel of the fork, the spring (M1) is extended, the internal pipe (2) and the external pipe (1) are moved away from each other and oil makes a passage in the opposite direction to the one described above.

The drawback of the fork (100) is related to the fact that the opening and closing of the axial conduit (50) of the tubular rod (5) can be exclusively obtained by manually actuating the actuation means of the pin (S) with a screwdriver, by screwing or unscrewing the adjustment screws on the first plug (10) and on the second plug (20) of the fork, thus determining a smaller or larger oil flow that affects the operation of the fork, making it hydraulically harder or softer.

It must be noted that it is practically impossible to manually actuate the adjustment screws of the pins in the fork when the motorcycle is moving. In other words, this operation must be made when the motorcycle is stopped.

This drawback has been at least partially overcome by the forks of known type, wherein the pin (S) is replaced with an electrovalve.

FIG. 2 is a sectional view of a fork according to the prior art, generally indicated with reference numeral (200).

Hereinafter elements that are identical or correspond to the ones described above are indicated with the same reference numerals, omitting their detailed description.

The fork (200) comprises an electrovalve (8) disposed inside the first chamber (C1a) of the cartridge (3). The electrovalve (8) automatically adjusts the oil flow inside the axial conduit (50) of the tubular rod (5) by means of an electronic control circuit.

In particular, said electronic circuit comprises a button that can be actuated by the user to change the setting of the electrovalve, also when the motorcycle is moving.

Alternatively, said electronic circuit comprises specific control software that processes the signals coming from sensors installed on the motorcycle and sends predefined controls to the electrovalve.

More precisely, said software cooperates with suitable sensors, such as a potentiometer and an accelerometer, which detect the traveling conditions of the vehicle where the fork is mounted. According to the detected conditions, said sensors send information to the control software that adjusts the settings of the electrovalve (8) in real time (few thousands of a second), changing the oil flow inside the axial conduit (50) of the tubular rod (5).

It must be noted that in few milliseconds the electrovalve (8) must respond to a series of impulses coming from said sensors and from the control software. Consequently, the electrovalve (8) has large dimensions and the cartridge wherein it is inserted has a higher diameter, as shown in FIG. 2.

More precisely, the fork (200) of FIG. 2 is provided with a cartridge (3) with larger dimensions than standard cartridges in order to house the electrovalve (8).

Moreover, the volume of the electrovalve (8) determines the volume of the piston (4) above which the electrovalve (8) is disposed.

In other words, because of the position of the electrovalve (8) above the piston (4), the piston (4) must be larger than a piston inserted into a standard fork, without electrovalve, such as the one shown in FIG. 1.

Consequently, the fact that the cartridge (3) and the piston (4) have large dimensions implies that the cartridge is pressurized.

It must be noted that a pressurized fork operates with pressure values comprised between 8 and 12 bar and this reduces the performance of the fork during its standard use.

In other words, a manufacturer that wants to produce a fork with electrovalve, as the one shown in FIG. 2, must bear all the production costs in order to completely re-design the fork, for which the parts with known performance and reliability that are available in stock cannot be used.

Moreover, this results in high costs for the new stock.

EP2413001 and EP2413002, in the name of the same applicant, disclose a fork assembly for motorcycles comprising a traditional mechanical valve.

DE19836286 discloses a hydraulic vibration damper for vehicles comprising a cylinder, a piston rod that is axially displaceable inside the cylinder, and a piston secured to the lower end of the piston rod in order to divide the cylinder into two working areas. Said shock-absorber has a different structure from the forks disclosed in documents EP2413001 and EP2413002 and is provided with an electrovalve that automatically adjusts the cross-section of two openings obtained on the piston to allow for oil flow between the two working areas.

BRIEF SUMMARY OF THE INVENTION

The purpose of the present invention is to devise a fork assembly with electrovalve capable of remedying the drawbacks of the prior art.

The main peculiarity of the fork assembly of the invention consists in that said electrovalve is situated in the working chamber, i.e. outside the cartridge.

BRIEF DESCRIPTION OF THE DRAWINGS

For explanatory reasons, the description of the fork assembly with electrovalve according to the present invention continues with reference to the attached drawings, which only have illustrative, not limiting value, wherein.

DETAILED DESCRIPTION OF THE INVENTION

Figure 1:
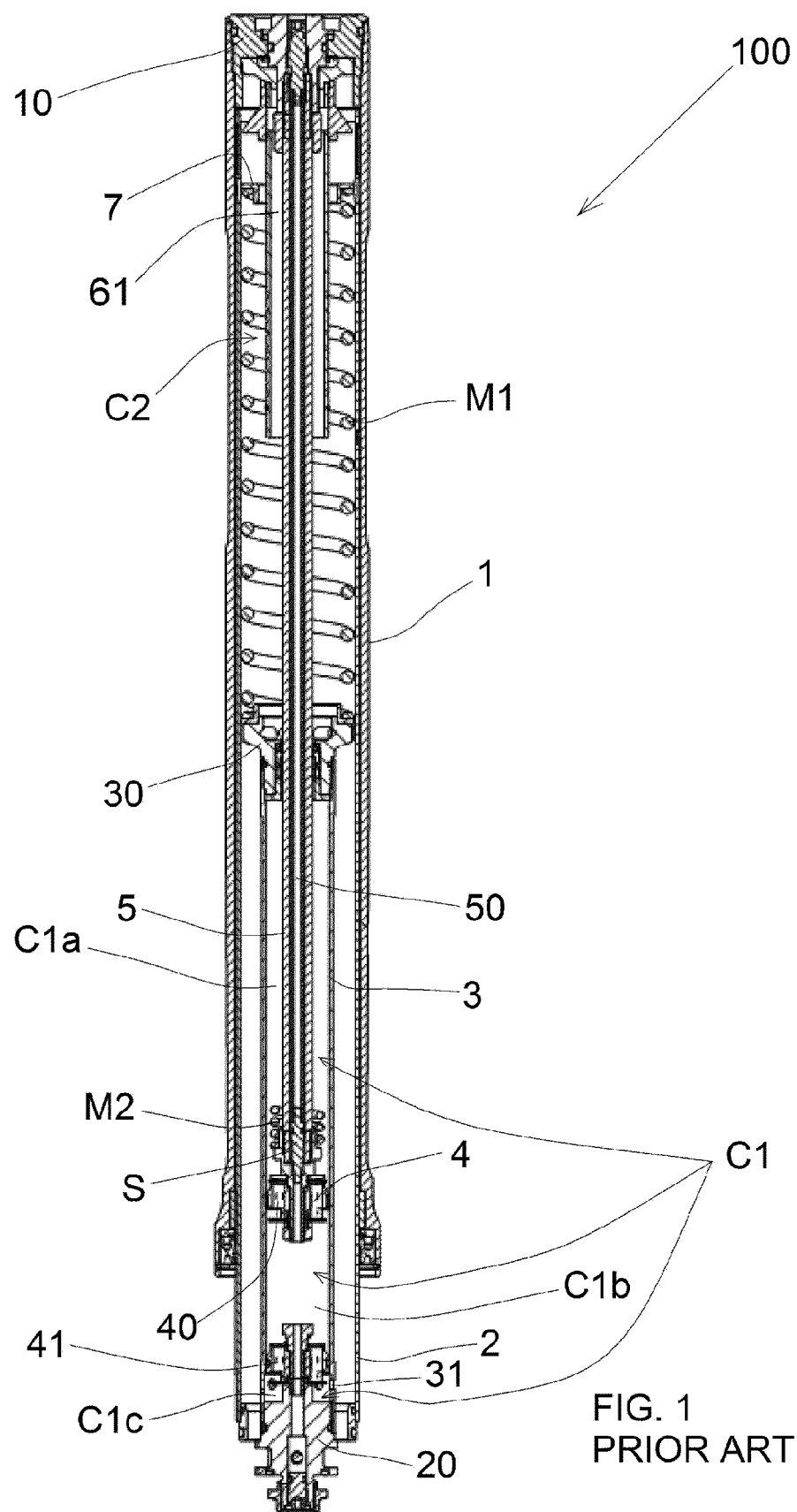
FIG. 1 is a sectional view of a fork according to the prior art, generally indicated with reference numeral (100)
Figure 2:
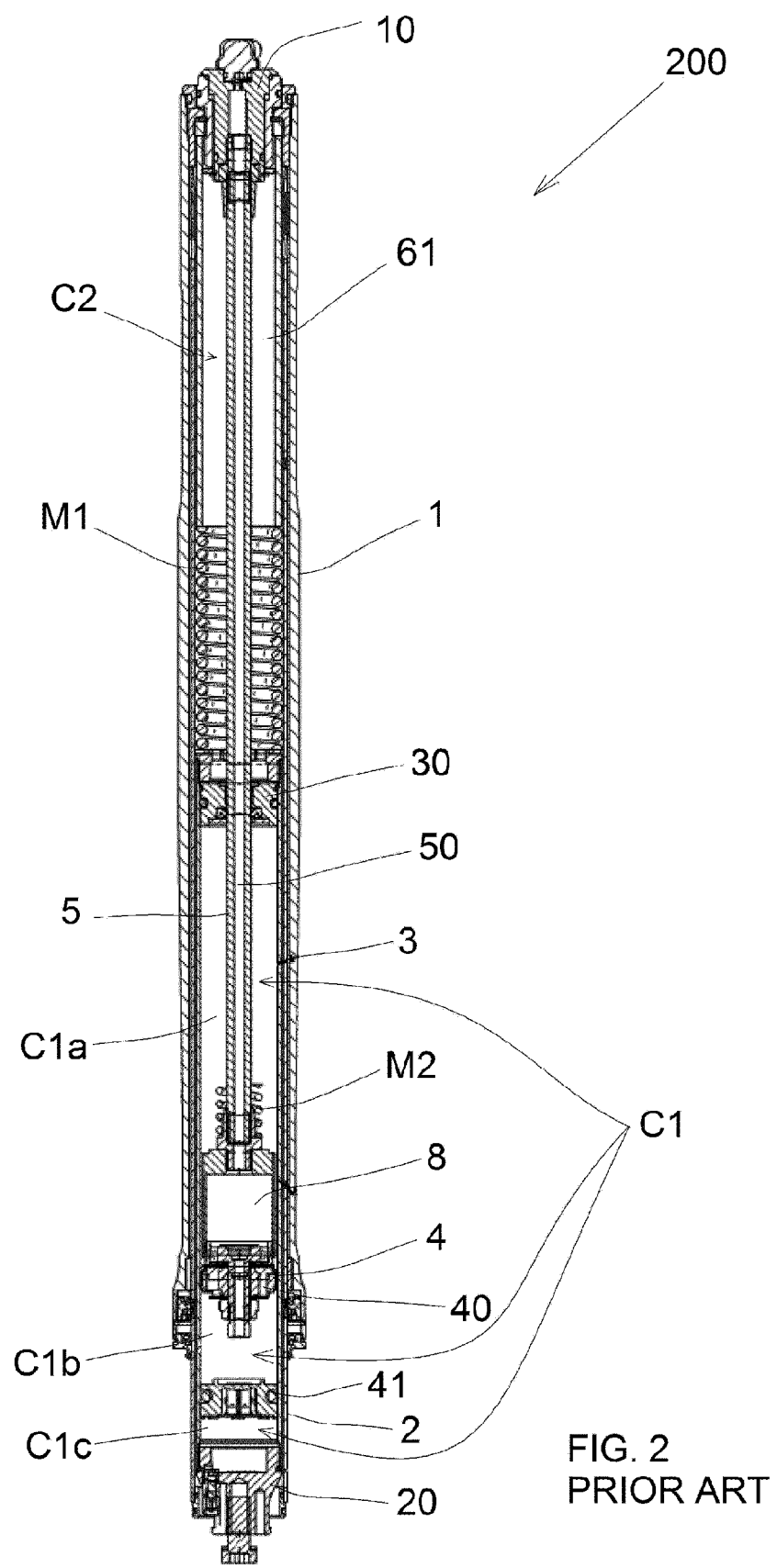
FIG. 2 is a sectional view of a fork according to the prior art, generally indicated with reference numeral (200)
Figure 3:
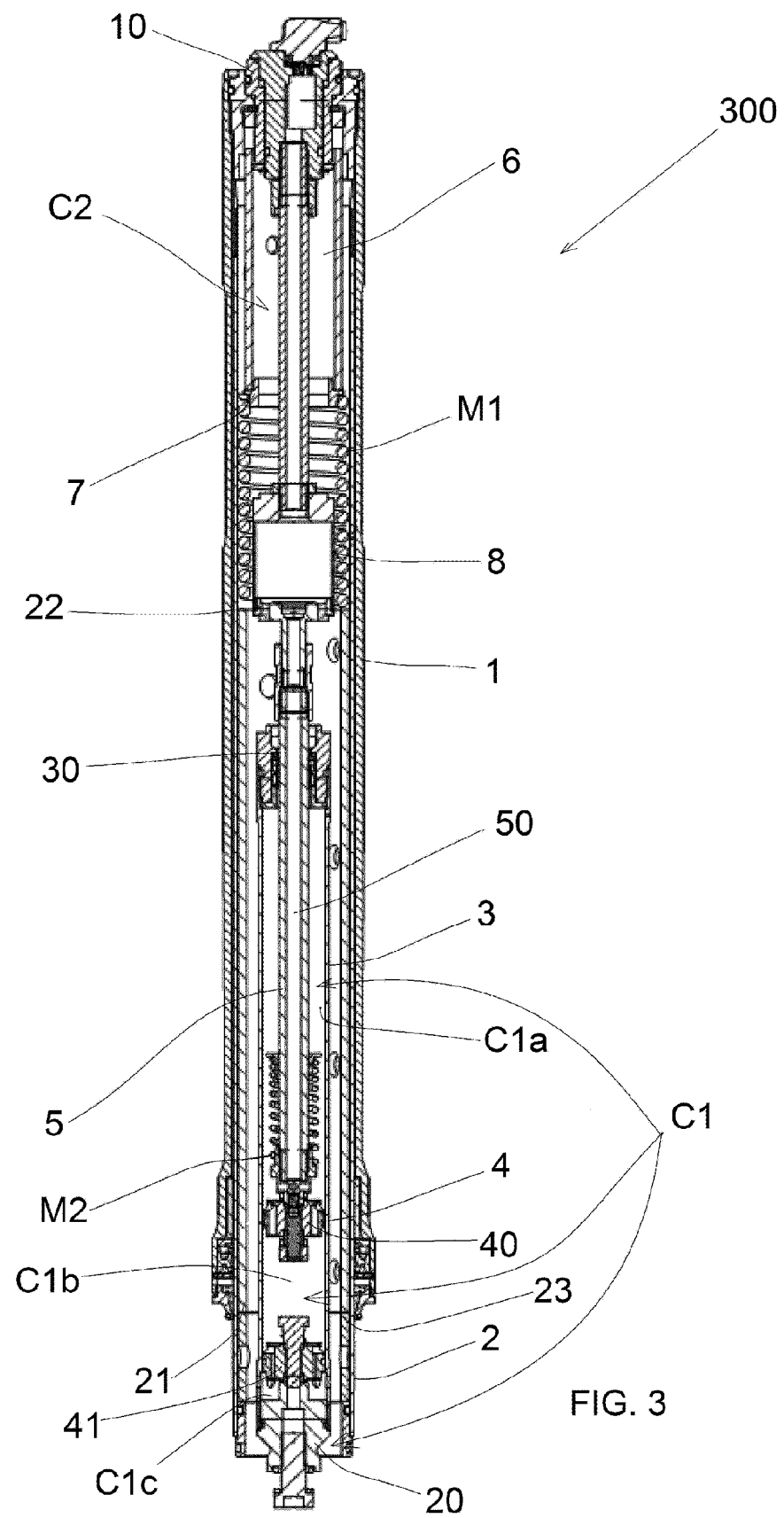
FIG. 3 is a sectional view of the fork assembly of the invention, according to a first embodiment.
Figure 4:
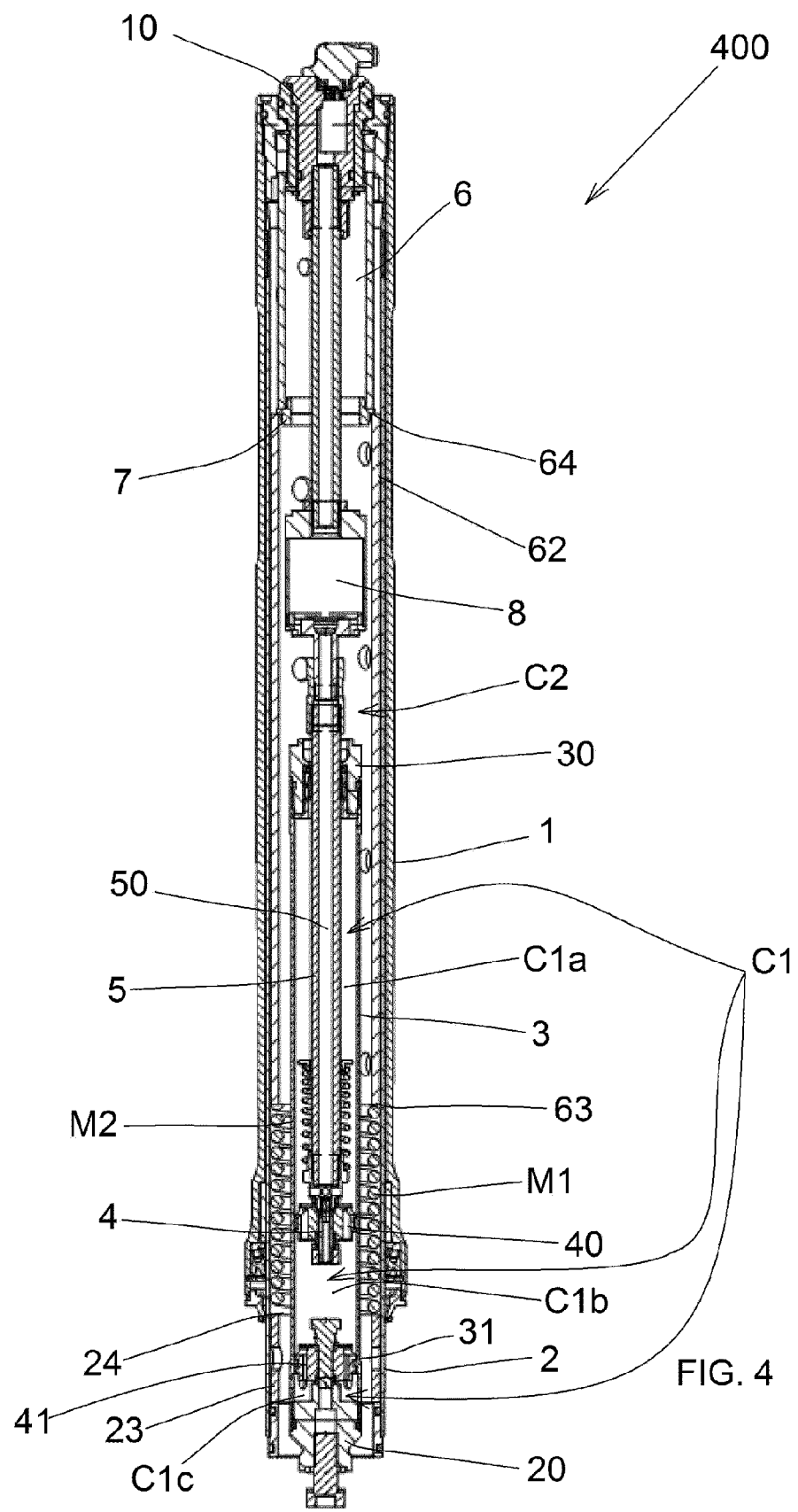
FIG. 4 is a sectional view of the fork assembly of the invention, according to a second embodiment.

Referring to FIGS. 3 and 4, the fork assembly of the invention is disclosed, generally indicated with reference numerals (300; 400).

As shown in FIG. 3, the fork assembly (300) of the invention comprises an external pipe (1) and an internal pipe (2) that telescopically slides inside the external pipe (1).

The fork assembly also comprises a first plug (10) that hermetically closes the upper end of the external pipe (1), and a second plug (20) that closes the lower end of the internal pipe (2), which is adapted to be fixed to the hub of a wheel.

A pre-charge pipe (21) is disposed inside the internal pipe (2) and provided with an upper end (22) and a lower end (23), resting on the bottom of the internal pipe (2).

Consequently, the pre-charge pipe (21) is joined to the internal pipe (2).

A cartridge (3) is disposed inside the pre-charge pipe (21) and is secured to the second plug (20) of the internal pipe (2) to which it is joined.

The cartridge (3) is provided with a chamber (C1) filled with oil or other lubricant.

A piston (4) is slidably mounted inside the cartridge (3) and slides inside the chamber (C1). The piston (4) is provided with holes or blades (40) adapted to make oil pass through the piston (4) during its movement in the chamber (C1).

A second piston (41) is joined to the second plug (20) of the internal pipe (2) and is provided with holes or blades for oil passage.

A tubular rod (5) is provided with a lower end secured to the piston (4) and an upper end secured to the first plug (10) of the external pipe (1). Consequently, the tubular rod (5) is joined to the external pipe (1). The tubular rod (5) is internally empty and defines an axial conduit (50) for oil passage.

Moreover, said tubular rod (5) has a lower diameter than the chamber (C1) of the cartridge (3) in such manner to be received inside said cartridge (3).

The upper end of the cartridge (3) is closed with a closing bush (30) provided with a hole that receives the tubular rod (5) and acts as guide for said tubular rod.

A working chamber (C2) extends outside the cartridge (3) and is defined in lower position by the second plug (20) and in upper position by the first plug (10) of the external pipe (1).

The two pistons (4, 41) divide the chamber (C1) of the cartridge (3) into three chambers (C1a, C1b, C1c), of which a first chamber (C1a), a second chamber (C1b) and a third chamber (C1c).

More precisely, the first chamber (C1a) of the cartridge (3) is defined by the piston (4) and the closing bush (30) of the cartridge, the second chamber (C1b) of the cartridge (3) is defined by the second piston (41) and the piston (4) and the third chamber (C1c) is defined by the second plug (20) of the internal pipe (2) and the second piston (41).

A second pre-charge pipe (6) is secured to the first plug (10) of the external pipe (1) and extends inside the working chamber (C2) coaxially to the internal pipe (2).

Still referring to FIG. 3, the fork assembly (300) comprises an electrovalve (8) disposed in the working chamber (C2) and mechanically secured to the tubular rod (5).

A spring (M1) is disposed inside the internal pipe (2), in the working chamber (C2), around the second pre-charge pipe (6) and the electrovalve (8).

More precisely, said spring (M1) is disposed in intermediate position between the upper end (22) of the pre-charge pipe (21) and a metal ring (7) secured to the second pre-charge pipe (6). By manually actuating on the metal ring (7) by means of an external adjustment means, the compression level of the spring (M1) can be adjusted.

Advantageously, a second spring (M2) is disposed around the tubular rod (5) in proximity to the piston (4) and inside the cartridge (3). The second spring (M2) is stopped against the closing bush (30) of the cartridge (3) at the end of the extension travel of the fork assembly (300).

FIG. 4 is a view of the fork assembly of the invention according to a preferred alternative embodiment that provides for positioning the spring (M1) not around the electrovalve (8), but on the bottom of the fork, around the cartridge (3), to further reduce the volume of the external pipe (1) and manage the internal volumes of the fork assembly at best in order to favor the correct movement of the oil inside the three chambers (C1a, C1b, C1c) of the cartridge (3) and inside the working chamber (C2).

The fork assembly of FIG. 4 is generally indicated with reference numeral (400). It must be noted that elements that are the same or correspond to those already described are indicated with the same reference numerals, omitting their detailed description.

The fork assembly (400) comprises a first sleeve (23) that is joined to the internal pipe (2) and provided with an upper end (24) disposed at the lower end of the spring (M1).

The fork assembly (400) also comprises a second sleeve (62) secured to the cylinder (6) and consequently joined to the external pipe (1).

In particular, the second sleeve (62) is provided with a lower end (63) and an upper end (64) secured to the cylinder (6) with a metal ring (7).

Still with reference to FIG. 4, the fork assembly (400) comprises a spring (M1) disposed inside the internal pipe (2) around the cartridge (3).

More precisely, the spring (M1) is provided with a first stop surface that coincides with the upper end (24) of the first sleeve (23) and a second stop surface that coincides with the lower end (63) of the second sleeve (62).

The invention claimed is:

1. A fork assembly comprising:
an external pipe or sleeve;
an internal pipe slidably housed inside said external pipe;
a first plug of said external pipe;
a second plug of said internal pipe;
a cartridge disposed inside said internal pipe and joined with said internal pipe; said cartridge being provided with a chamber;
a piston slidably mounted inside said chamber of said cartridge; said piston being provided with holes or blades to make oil pass through the piston during movement of said piston in the chamber;
a tubular rod with a first end joined to the external pipe and a second end joined to the piston; said tubular rod has an axial conduit for oil passage;
a closing bush adapted to close said cartridge, said closing bush being provided with a hole wherein said tubular rod is slidably inserted; and
a working chamber external to the cartridge; said working chamber being defined by said second plug of said internal pipe and said first plug of said external pipe;
elastic means disposed inside said internal pipe;
an electrovalve situated in the working chamber on the tubular rod and adapted to adjust the oil flow inside the axial conduit of the tubular rod;
characterized by the fact that
said electrovalve is positioned between the closing bush and the first plug of the external pipe.

2. The fork assembly of claim 1, comprising a second piston joined to the second plug of the internal pipe and provided with holes or blades for oil passage; said cartridge being provided with at least one hole disposed between said second piston and the second plug of the internal pipe; said hole providing communication between the chamber of the cartridge and the working chamber.

3. The fork assembly of claim 1, wherein said elastic means is disposed in intermediate position between said closing bush of the cartridge and said first plug of the external pipe.

4. The fork assembly of claim 1, wherein said elastic means is disposed in intermediate position between said closing bush of the cartridge and said second plug of the internal pipe.

5. The fork assembly of claim 1, wherein said elastic means comprises a spring.

6. The fork assembly of claim 1, comprising at least one pre-charge pipe situated inside the internal pipe.

7. The fork assembly of claim 1, comprising a second spring disposed around the tubular rod, in proximity to the piston and inside the cartridge; said second spring being stopped against the closing bush of the cartridge at the end of the extension travel of the fork assembly.

* * * * *